Oct. 7, 1969          J. BELADA          3,470,596
METHOD AND APPARATUS FOR FASTENING METAL SHEETS
Filed Sept. 26, 1966          3 Sheets-Sheet 1
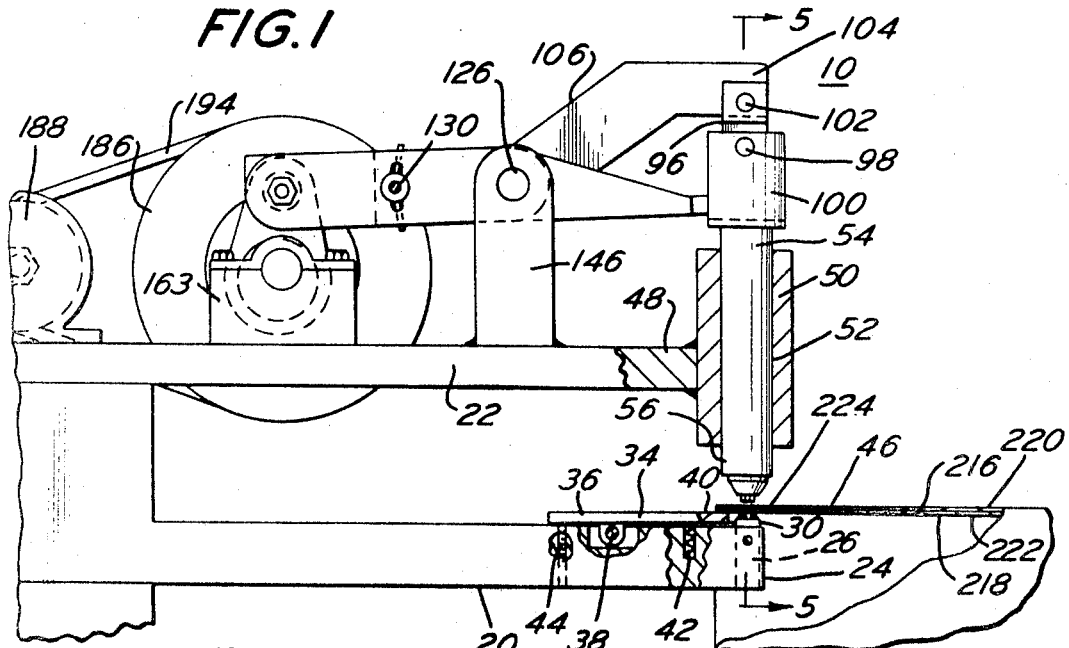
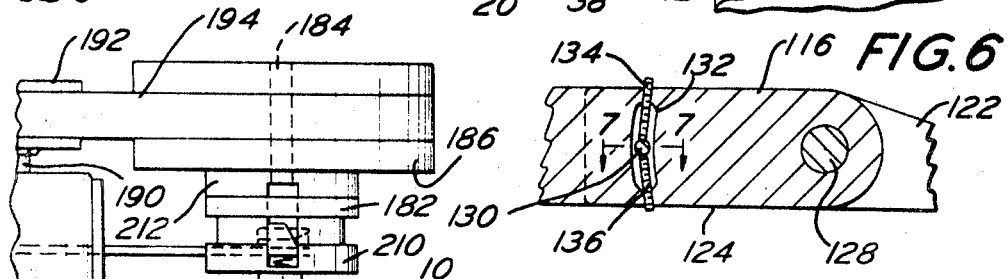
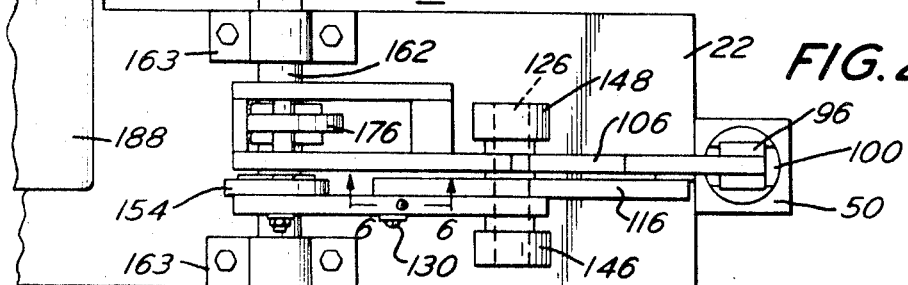
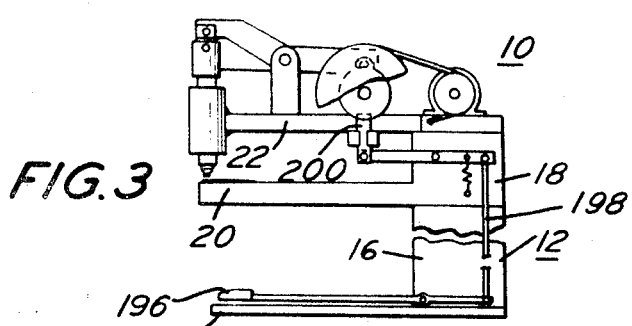
INVENTOR.
JOHN BELADA
BY Jacob Trachtman
ATTORNEY

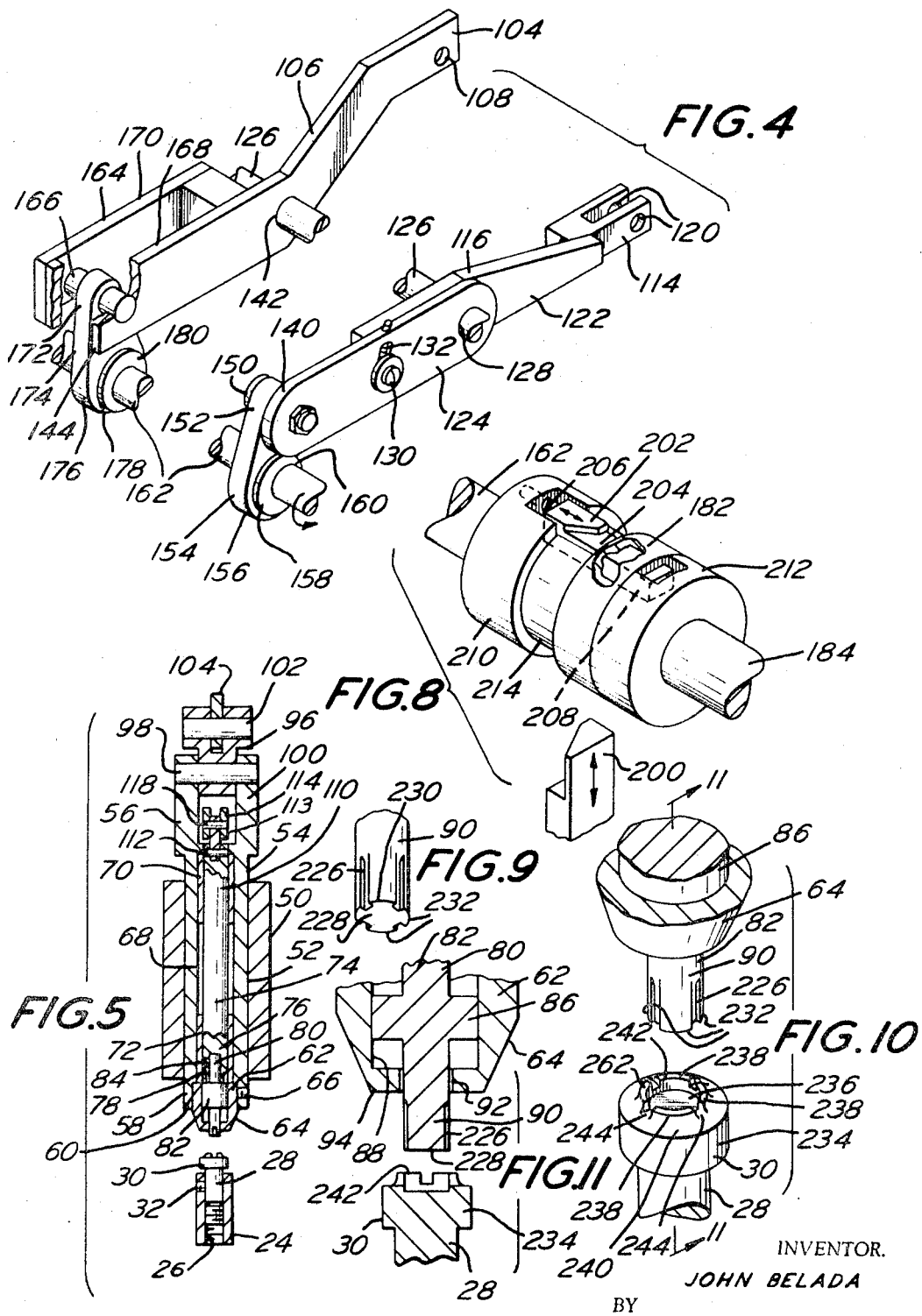

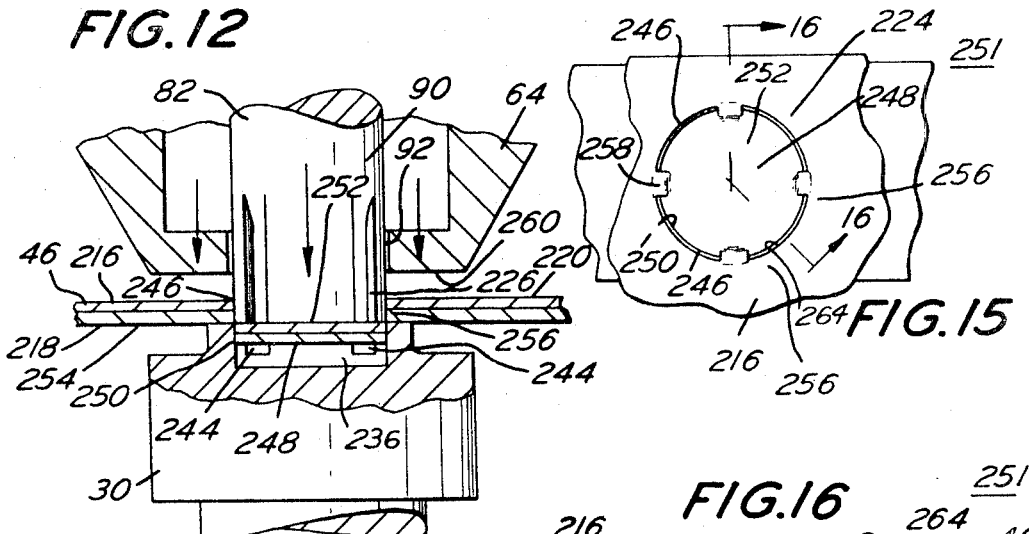
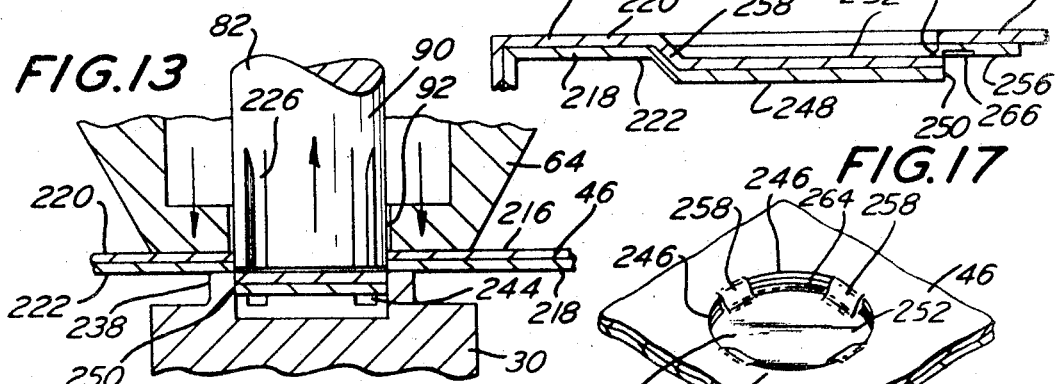
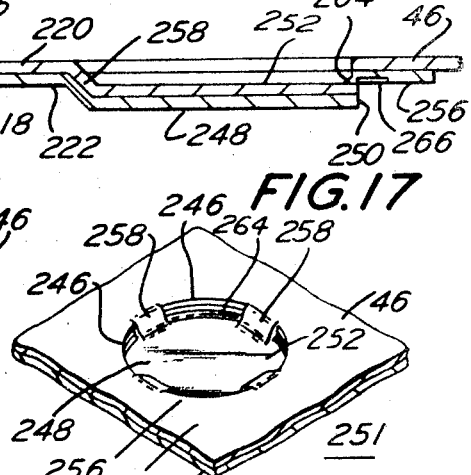
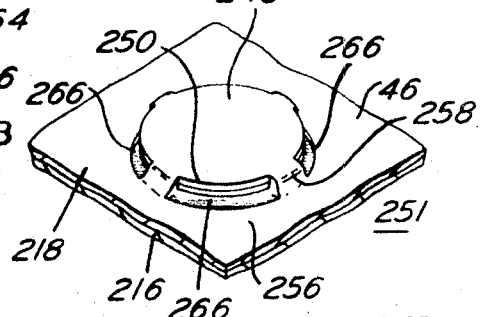

United States Patent Office 3,470,596
Patented Oct. 7, 1969

3,470,596
METHOD AND APPARATUS FOR FASTENING METAL SHEETS
John Belada, Glassboro, N.J., assignor to A. R. Molino, Glassboro, N.J.
Filed Sept. 26, 1966, Ser. No. 582,003
Int. Cl. B21d *39/00;* B23p *11/00*
U.S. Cl. 29—21.1                 19 Claims This invention relates to a fastening means and method, and more particularly to a fastening means and method for securing together two sheets of metallic material at locations where one sheet is positioned over another.

Although prior devices and methods have been provided for securing together several sheets of superpositioned metallic materials, such means and methods have produced connections which have not been sufficiently durable or strong to allow the practical use of such fastening means and method as a substitute for rivets and other such devices used for fastening purposes.

It is therefore a principal object of the invention to provide a new and improved fastening means and method for securing together several sheets of material providing a degree of reliability and security required for producing structural elements.

Another object of the invention is to provide a new and improved fastening means and method which permits the fastening of two sheets of metallic material without the use of additional materials such as rivets or staples.

Another object is to provide a new and improved means and method which is highly versatile in application and uses the material being fastened for providing the securing means.

Another object of the invention is to provide a new and improved fastening means and method which can be rapidly and efficiently produced and carried out.

Another object of the invention is to provide a new and improved fastening means and method which is simple in operation and cost saving in use.

The above objects of the invention are achieved by providing a method of securing together two sheets of metallic material comprising the steps of positioning a sheet of metallic material over another sheet of metallic material with which it is to be secured providing said sheets with top and bottom exposed surfaces, shearing through said sheets of material along a plurality of disconnected lines on said top surface of said sheets encompassing a region of said sheets and displacing said region of said sheets with respect to the portion of said sheets surrounding said region to form respective displaced and non-displaced edges at said shear lines, and applying a compressive force to said sheets of material on opposite sides thereon along said portion surrounding said region proximate said non-displaced edges and extruding material therebetween to form new edges of extruded material extended over and beyond the displaced edges of said displaced region for securing together said sheets of metallic material. The top surface of said sheets of said region is displaced to be substantially proximate to the bottom surface of said portion surrounding said region and the new edges of the extruded material extend over the top surface of said displaced region of said sheets of metallic material. The said compressive force is applied to said opposite top and bottom surfaces of said sheets along said portion surrounding said region proximate said non-displaced edges, with a force applied to the bottom surface of said sheets of material being along a narrow strip of less area than the area along which the force is applied to the top surface for forming said new edges of extruded material and forming elongated depressions proximate the new edges of extruded material.

In performing the shearing step, the sheets of material may be sheared by applying a force on the top surface of said sheets by using a punch element and applying a counter force to the bottom surface of said sheets by using a die element, while when applying the compressive force an anvil element may be used for applying force on the top surface of said sheets of material while said die element applies a counter force to the bottom surface of said sheets of material. The die element is provided with elevated ridge surfaces for applying force to the bottom surface of said material proximate said non-displaced edges along a narrow strip to form said new edges of extruded material and producing elongated depressions proximate to the new edges of extruded material.

The method of the invention when carried out produces the fastening means of the invention which secures together two sheets of metallic material and comprises first and second sheets of metallic material with one sheet being positioned over another providing top and bottom exposed surfaces, said sheets having a region encompassed by disconnected lines defining the edges of said region of said sheets and its said edges being displaced with respect to the portion of said sheets surrounding said region, said portion of said sheets surrounding said region having an extruded edge corresponding to each edge of said region which extends from the portion surrounding said region over and beyond the corresponding displaced edge of said displaced region for securing together the said sheets of material. The top surface of said displaced region of said sheets is substantially proximate the bottom surface of said portion surrounding said region and said extruded edges extend over the top surface of the displaced region of said sheets. The bottom surface of said portion surrounding said displaced region of said sheets is provided with a plurality of elongated depressions proximate to the displaced edges of the displaced region for providing the material for said extruded edges and producing a fastening means of higher reliability, durability and strength.

The means for securing together two sheets of metallic material provided by the invention comprises punch means for engaging the top surface of two sheets of metallic material one sheet positioned over the other which are to be secured together, said punch means having a plurality of spaced edges for shearing said material along a plurality of disconnected lines encompassing a region of said sheets and a center portion for displacing said region of said sheets with respect to the portion of said sheets surrounding said region to form respectively displaced and non-displaced edges at said shear lines, and die means having a central opening for receiving said punch means and said region of said sheets displaced thereby and a plurality of spaced edges about said central opening for coacting with respective ones of said edges of said punch means for shearing said sheets of material along said disconnected lines encompassing said region, and a plurality of ridges coextensive with said edges for applying force to the bottom surface of said material proximate said non-displaced edges along a narrow strip for forming new edges of extruded material extending over and beyond said displaced edges of said displaced region and producing elongated depressions proximate the new edges of extruded material. An anvil means having a central opening for movably receiving said punch means therethrough is provided having a substantially flat surface surrounding its central opening for coacting with the plurality of ridges of said die means for applying force to the portion of said sheets along said non-displaced edges for extruding material therebetween to form new edges of extruded material extending over and beyond the displaced edges of said displaced portion for securing together such sheets of material.

The invention also provides means for supporting said punch means and anvil means for movement toward and away from said die means with said punch means extending through the central opening of said anvil means, means supporting said die means in alignment for coaction with said punch means and anvil means, and motive means for actuating said punch means and anvil means for movement toward and away from said die means during a fastening operation. The motive means during the fastening operation, initially moves said punch means towards said die means for shearing and displacing said region of said sheets of material and subsequently moves said anvil means towards said die means for retaining said sheets of material therebetween while the motive means moves said punch means away from said die means. The motive means continues to move the anvil means towards the die means for compressing material between the anvil and die means for extruding material therebetween to form new edges of extruded material extending over and beyond the displaced edges of said displaced portion for securing together such sheets of material, said motive means thereafter moving said anvil means away from said die means for disengaging said sheets of material. For this purpose, the motive means includes a first pivoted lever means having a first end connected with said punch means for providing linear reciprocal movement of said punch means, a second pivoted lever means having a first end connected with said anvil means for providing linear reciprocal movement of said anvil means, said first and second lever means each having a second end. The motive means includes drive means engaging the second ends of said lever means for producing motion by said punch means towards said die means preceeding the motion of said anvil means towards the die means and motion of said punch means away from said die means preceeding the motion of said anvil means away from said die means. The drive means comprises a rotatably driven shaft with first and second off-center cylindrical sections rotating therewith, said first cylindrical section being angularly advanced with respect to the second said cylindrical section by approximately 45 degrees, and first and second link means each having a first end with a cylindrical bearing surface respectively engaging said first and second cylindrical sections of said shaft and a second end pivotally connected respectively with the second ends of said first and second lever means, whereby said first and second levers are actuated about their pivots by said link means with the motion of said first lever being advanced with respect to the motion of said second lever.

The foregoing and other objects of the invention will become more apparent as the following detailed description of the invention is read in conjunction with the drawings, in which:

FIGURE 1 is a front elevational view with portions broken away of a material fastening means embodying the invention, FIGURE 2 is a top elevational view with portions broken away of the material fastening machine of FIGURE 1, FIGURE 3 is a rear elevational view of reduced size of the machine means of FIGURE 1, FIGURE 4 is a perspective view of the pivoted lever means, link means, and drive shaft with off-center cylindrical sections of the machine means shown in FIGURE 1, FIGURE 5 is an enlarged sectional view taken on the line 5—5 of FIGURE 1, FIGURE 6 is an enlarged sectional view with portions broken away, taken on the line 6—6 of FIGURE 2, FIGURE 7 is a fragmentary sectional view taken on the line 7—7 of FIGURE 6, FIGURE 8 is an enlarged perspective view of the clutch means of the material fastening machine means of FIGURE 1, FIGURE 9 is a perspective view of the shearing and material displacing end of the punch means of the invention, FIGURE 10 is an enlarged perspective view with portions broken away of the punch means, die means and anvil means of the invention in aligned relationship, FIGURE 11 is a sectional view taken on the line 11—11 of FIGURE 10, FIGURES 12, 13 and 14 illustrate the several steps of the method of the invention, FIGURE 15 is a top elevational view of a securing means produced by the method and material fastening machine means of the invention, FIGURE 16 is a sectional view taken on line 16—16 of FIGURE 15, FIGURE 17 is a top perspective view of the fastening means shown in FIGURE 15, and FIGURE 18 is a bottom perspective view of FIGURE 17.

Like reference numerals designate like parts throughout the several views.

Refer to the figures in which FIGURES 1, 2, and 3 disclose a material fastening machine means 10 embodyiyng the invention comprising the base 12 having a horizontal foot 14 and a vertical portion 16. The vertical portion 16 of the base 12 supports a body 18 having an extending lower arm 20 and an upper table 22. The extending end 24 of the lower arm 20 is provided with a vertically extending opening 26 therethrough (see FIGURE 1) for receiving the cylindrical end 28 of a die means 30 as clearly shown in FIGURE 5. A set screw 32 is provided for securing the die means 30 in position with said lower arm 20.

A stripper means 34 of well known construction comprising a lever 36 is movable about a pivot 38 with its end 40 positioned proximate to the die means 30 and biased by spring means 42, 44 for pivoting the lever 36 in the counterclockwise direction as seen in FIGURE 1, and urging sheets 46 of material out of engaging with the die means 30 and stripping same from the die means after a fastening operation.

The end 48 of the table 22 has secured with it a guide block 50 having a vertical opening or bore 52 therethrough in axial alignment with the opening 26 of the lower arm 20. The cylindrical portion 54 of an anvil driving shaft 56 is movably received within the opening 52 of the guide block 50. The bottom end 58 of the shaft 56 is provided with an annular recess 60 which receives within it the upper end 62 of an anvil means 64. The anvil means 64 is secured in position with the driving shaft 65 by a set screw 66.

The anvil driving shaft 56 has an opening 68 therethrough having annular bearings 70, 72 at its upper and lower ends for slidably receiving therein a tubular punch driving shaft 74. The lower end 76 of the shaft 74 has an opening 78 for receiving the shank 80 of a punch means 82. The punch means 82 is secured with the shaft 74 by means of a set screw 84.

The punch means 82 is provided with an enlarged cylindrical central portion 86 which engages the inner cylindrical wall 88 which provides a cavity within the anvil means 64. The punch element 90 extends downwardly from the central portion 86 and passes through an opening 92 in the bottom portion 94 of the anvil means 64.

A first link means 96 is connected at one end by a pin 98 with the top 100 of the anvil driving shaft 56, while being connected at the other end by a pin 102 with the end 104 of a pivoted arm means 106 (see FIGURE 4) passing through its opening 108.

A second link means 113 is pivotally connected at one end with the top end 110 of the punch drive shaft 74 by a pin 112 with its other end pivotally joined with the forked end 114 of the lever means 116 by a pin 118 passing through its aligned openings 120 as shown by FIGURES 4 and 5. The lever means 116 comprises two linked sections 122 and 124 which are pivoted about a shaft 126 received through aligned openings 128 of said arm sections 122, 124. The sections 122, 124 are adjustably secured together by a screw 130 which threadedly engages the section 122 of the lever 116 and extends through a slot 132 of the section 124. As clearly seen from FIGURE 6 a pair of positioning screw elements 134, 136 engage the screw 130 in said slot 132 for adjusting its position along said slot and thereby relatively fixing the sections 122 and 124 with respect to each other. Thus if the screw 130 is moved towards the top of slot 132, the front end 114 of the lever means 116 is moved downwardly with respect to the rear end 140 of the lever means 116. Since the ends 104 and 114 of the lever means 106 and 116 respectively are linked with the anvil drive shaft 56 and tubular punch drive shaft 74 respectively, the relative position between the anvil means 64 and the punch means 82 may be correspondingly adjusted.

The shaft 126 also extends through an opening 142 between the ends 104 and 114 of the lever means 106 for pivotally supporting the same. The shaft 126 extends horizontally transverse the table 22 and is supported at its ends by the pair of end brackets 146, 148 (see FIGURE 2), which end brackets are secured as by welding with the upper table 22.

The rear end 140 of the lever means 116 is pivotally joined by a bolt 150 to the top end 152 of a link means 154. The bottom enlarged portion 156 of the link means 154 has an opening therethrough provided with a cylindrical bearing surface 158 which slidingly engages and rotatably receives therein a cylindrical drive section 160 which is mounted off-center and secured with a drive shaft 162. The rotation of the drive shaft 162 results in the rotation of the off-center cylindrical driving section which imparts a reciprocating movement through the link means 154 to the end 140 of the lever means 116. Since the lever means 116 pivots about the shaft 126 its front end 114 is thus caused to execute an opposite reciprocating movement.

The rear end 144 of the lever means 116 provides a box structure 164 for supporting a pivot bolt 166 which extends through its side sections 168, 170. The pivot bolt 166 pivotally engages the top portion 172 of a link means 174 intermediate the side portion 168, 170 of the box structure 164, while the bottom portion 176 has a large opening 178 providing a cylindrical bearing surface engaging the cylindrical drive section 180 which is mounted upon and secured for rotation with the drive shaft 162 in spaced relationship to the cylindrical drive section 160. The cylindrical drive section 180 which is also secured in an off-center relationship with the drive shaft 162 is angularly retarded with respect to the drive section 160 to lag by 45 degrees. Thus, with the rotation of the drive shaft 162 the lever means 106 will be caused by the reciprocating motion transmitted by the link means 174 to its end 144, to pivot about the shaft 126 with its front end 104 transmitting a reciprocating motion which is in an opposite direction to the motion of its rear end 144.

However, since the drive cylinder 160 is advanced by 45 degrees with respect to the drive cylinder 180, the front end 114 of lever means 116 will begin its downward movement preceding the downward movement of the front end 104 of the lever means 106 by 45 degrees of rotation of the drive shaft 162. Thus, the punch element 90 of the punch means 82 will move downwardly towards the die means 30 in advance of the downward movement of the anvil means 64 towards the die means 30. Similarly with the downward movement of the end 140 of the lever 116, the punch means 82 will be moved upward and away from the die means 30 in advance and prior to the upward withdrawal movement of the anvil means 64. The significance of the relationship between the motions of the punch means 82 and the anvil means 64 with respect to each other and with respect to the die means 30 will be explained later in detail in connection with the operation of the machine 10 and the steps of the method of the invention.

The drive shaft 162 is rotatably supported by the bearing blocks 163 and controllably connected by a clutch device 182 to the shaft 184 of a fly wheel 186. The fly wheel 186 is rotated at a constant angular velocity by an electric motor 188 which has its shaft 190 joined to a drive pulley 192 which is linked with the fly wheel 186 by a drive belt 194. When the machine means 10 is not performing a material fastening operation, the clutch device 182 disconnects the shaft 184 of the fly wheel from the drive shaft 162. However, when a fastening operation is to be performed and the foot pedal 196 is depressed, the linkage means 198 are activated to withdraw the key element 200 (see FIGURES 3 and 8) by its downward motion disengaging the cam portion 202 of the bolt element 204 causing the bolt element to move forward or be advanced by the spring 206 into the opening 208 thereby locking the normally stationary section 210 of the clutch means 182 with the normally rotating section 212.

If after being depressed, the foot pedal 196 is immediately released, the key element 200 moves upwardly into the annular recess 214 in the normally stationary section 210 and engages the cam portion 202 as the drive shaft 162 completes a full revolution. When the key element 200 engages the cam element 202 further rotation of the section 210 of the clutch device 182 forces the bolt element 204 to be withdrawn against the action of the spring 206 from the opening 208 in the normally rotating section 212. This terminates the rotation of the normally stationary section 210 and the drive shaft 162 until the key element 200 is again withdrawn by the actuation of the foot pedal 196. The clutch device 182 when deactivated, stops the shaft 162 in a position as shown in FIGURE 1 with the punch means 82 and anvil means 64 withdrawn from the die means 30, and the punch means 82 positioned to initiate its downward movement towards the die means 30.

In operation of the material fastening machine means 10 to secure two sheets 46 of metallic material together, a portion of one sheet 216 is positioned over a portion of a second sheet 218 which are to be secured together providing a top exposed surface 220 and a bottom exposed surface 222 of the top and bottom sheets 216, 218 respectively. The remaining surfaces of said portion of said sheets contact each other as in a region 224 where the sheets 48 are to be secured together. The region 224 of the sheets 46 is positioned as shown in FIGURE 1 with its bottom exposed surface 222 over the die means 30 after which the foot pedal 196 is depressed and immediately released. The drive shaft 162 is thereby caused to make a complete revolution which results in the following sequence of events which are clearly illustrated by FIGURES 12 through 14.

The punch means 82 moves downwardly in advance of the anvil means 64 so that its punch element 90 extends through the opening 92 of the anvil means 64. The punch element 90 is circular in cross section and is provided with a plurality, namely four vertical channels 226, extending to the bottom surface 228 and interrupting the circular bounding edge 230 of the bottom surface 228 to form four disconnected arcuate lines 232. The surface 228 is a substantially flat surface.

The top portion 234 of the die means 30 has a central cylindrical opening or depressed region 236 dimensioned to receive therein with close tolerance the punch element 90 of the punch means 82. Four ridges 238 extend upwardly from the top surface 240 of the die means 30 providing narrow strip surfaces 262 surrounding the opening or depressed region 236 with their inner edges 242 defining the boundaries of the opening or depressed region 236. Each of the ridges 238 is separated by a channel 244 which corresponds in width and angular disposition to the width and angular disposition of the vertical channels 226 of the punch element 90 of the punch means 82. Similarly the inner edges 242 correspond very closely in length and angular disposition to the length, angular disposition of the edges 232 of the punch element 90 of the punch means 82.

As the punch element 90 moves downwardly and contacts the top surface 220 of the sheets 46 of the material in the region 224 where the sheets 216 and 218 are to be joined together, the edges 232 of the punch element 90 coact with the edges 242 of the die means 30 to shear the sheets 46 of material along disconnected lines 246 of equal length in arcuate form lying along circular boundary 230 of the punch element 90. As seen from FIGURE 12, the punch element 90 continues its downward movements until the central region 248 of sheets 46 bounded by its edges 250 produced by the shearing action of the punch element 90, is displaced into the opening or depression 236 of the die means 30, to the extent where the top surface 252 of the region 248 is substantially in the same plane with the bottom surface 254 of the portion 256 surrounding the displaced central region 248.

The four arcuate edges 246 in the portion 256 surrounding the displaced central region 248 are thus positioned proximate to their complementary arcuate edge portions 250 of the displaced central region 248 as seen from FIGURES 15 through 18 illustrating a fastening means 251 produced by the machine means 10; the edges 246 are disconnected from the other edges 246, as are the edges 250 disconnected from the other edges 250 by the connecting strips 258 which are also four in number and join the portion 256 surrounding the displaced region 248 with the displaced region 248.

During the shearing and displacing action of the punch means 82 and die means 30, the anvil means 64 is also moving in the downward direction as indicated by the arrows of FIGURE 12 so that when the punch element 90 has completed its shearing and displacing action and starts to move in the upward direction, the substantially flat bottom surface 260 of the bottom portion 94 surrounding the opening 92 of the anvil means 64 contacts the top surface 220 of the portion 256 of the sheets 46 of material as shown in FIGURE 13 retaining same position while the die element 90 is withdrawn out of contact with the sheets 46 of material.

With the withdrawal of the die element 90 the anvil means 64 continues its downward motion as indicated in FIGURE 14 and in coaction with the die means 30, results in the application of compressive forces on opposite top and bottom surfaces 220, 222 of the sheets 46 of material at the portion 256 surrounding the non-displaced edges 246. The force applied by the die means 30 to the bottom surface 254 is applied by the top surfaces 262 of the upstanding ridges 238 providing narrow disconnected strips bounding the opening or depressed region 236. The pressure or force is applied by the ridges 238 along the narrow strips proximate the non-displaced edges 246 formed during the shearing operation. The force applied by the bottom surface 260 of the anvil means 64, to the top surface of the sheet 216 is also over a circular region surrounding the non-displaced edges 246. However, the force applied by the anvil means 64 is distributed over a greater area than the area over which the force is applied by the ridge 238 of the die means 30. This results in a greater pressure being exerted by the narrow strip surfaces 262 of the die means 30, resulting in a displacement of material forming the extruded lips or edges 264 which extend over and beyond the displaced edges 250 of the displaced central region 248 and contacting the top surface 252 of the displaced region 248. The extruded lips or edges 264 are formed from material displaced from the bottom sheet 218 proximate to the displaced edges 250 of the displaced region 248 producing the elongated depressions or channels 266.

The extruded lips or edges 264 formed from the metallic material of the sheets 46 and mainly from the material of the bottom positioned sheet 218 is of great strength and overlies and encloses the displaced edges 250 of the displaced region 248. The extruded edges 250 by contacting the upper surface 252 of the region 248 prevents the removal of the top sheet 216 from the bottom sheet 218 of the displaced portion 248, thereby securing the top and bottom sheets 216, 218, securely together. The extruded edges 246 are also in abutting relationship with the connecting strips 258, thereby opposing twisting action of one sheet 216 with respect to the other sheet 218.

The use of the disclosed method for producing the securing means 251 an embodiment of which is disclosed in FIGURES 15 through 18 inclusive, whereby material from the sheets 46 being fastened together is extruded from the bottom sheet portion surrounding the non-displaced edges and proximate the displaced edges of the displaced central region 246, results in a fastening means which is highly durable and effective for securely fastening sheets of material used for structural components.

Although a particular embodiment of the machine device 10 is disclosed illustrating the operation and performance of the method of the invention, the method, of course, may be carried out by other machine means or by hand utilizing the punch, die and anvil means in accordance with the invention.

It will be obvious to those skilled in the art that the invention may find wide application with appropriate modifications to meet the individual design circumstances, but without substantial departure from the essence of the invention.

What is claimed is:
1. A method of securing together two sheets of metallic material comprising the steps of:
   (a) positioning a sheet of metallic material over another sheet of metallic material with which it is to be secured providing said sheets with top and bottom exposed surfaces,
   (b) shearing through said sheets of material along a plurality of disconnected lines on said top surface of said sheets encompassing a region of said sheets and displacing said region of said sheets with respect to the portion of said sheets surrounding said region to form respectively displaced and non-displaced edges at said shear lines, and
   (c) applying a compressive force to said sheets of material on opposite sides thereof along said portion surrounding said region and contiguous with said non-displaced edges and extruding said material therebetween to form new edges of extruded material extending over and beyond the displaced edges of said displaced region for securing together said sheets of material, said material being extruded substantially from the bottom exposed surface of said sheets.

2. The method of claim 1 in which the disconnected lines encompassing said region of step (b) above comprises three or more disconnected lines.

3. The method of claim 1 in which said top surface of said sheets of said region is displaced in step (b) above to be substantially proximate to the bottom surface of said portion surrounding said region and the new edges of extruded material produced in step (c) above extend over the top surface of said displaced region of said sheets of material.

4. The method of claim 3 in which the compressive force applied in step (c) above is applied to said opposite top and bottom surfaces of said sheets along said portion surrounding said region and contiguous with said non-displaced edges, with the force applied to the bottom surface of said sheets of material being along a narrow strip of less area than the area along which the force is applied to the top surface for forming said new edges of extruded material.

5. The method of claim 4 in which the compressive force applied in step (c) above extrudes material from the bottom surface of said sheets in said portion surrounding said region and contiguous with said non-displaced edges forming elongated depressions proximate the new edges of extruded material.

6. The method of claim 5 in which the disconnected lines encompassing said region of step (b) above comprises three or more disconnected lines.

7. The method of claim 6 in which the disconnected lines encompassing said region of step (b) above comprises four disconnected lines in a substantially circular configuration.

8. The method of claim 3 in which said sheets of material are sheared in step (b) above by applying a force to the top surface of said sheets by using a punch element and applying a counter force to the bottom surface of said sheets by using a die element.

9. The method of claim 3 in which the compressive force of step (c) above is applied to the top surface of said sheets of material by using an anvil element and to the bottom surface by using a die element.

10. The method of claim 9 in which said die element is provided with an elevated ridge surface for applying force to said bottom surface of said material proximate said non-displaced edges along a narrow strip for forming said new edges of extruded material by producing elongated depressions proximate the new edges of extruded material.

11. Means for securing together two sheets of metallic material comprising:
  (a) punch means for engaging the top surface of two sheets of metallic material one positioned over the other which are to be secured together having a plurality of spaced edges for shearing said material along a plurality of disconnected lines encompassing a region of said sheets and a center portion for displacing said region of said sheets with respect to the portion of said sheets surrounding said region to form respectively displaced and non-displaced edges at said shear lines,
  (b) die means having a central opening for receiving therein said punch means and said region of said sheets displaced thereby and a plurality of spaced edges about said central opening for coacting with respective ones of said edges of said punch means for shearing said sheets of material along said plurality of disconnected lines encompassing said region, and a plurality of ridges coextensive with said edges for applying force to the bottom surface of said material proximate said non-displaced edges along a narrow strip for forming new edges of extruded material extending over and beyond said displaced edges of said displaced region and producing elongated depressions proximate the new edges of extruded material, and
  (c) anvil means having a central opening for movably receiving said punch means therethrough and having a substantially flat surface surrounding said central opening for coacting with the plurality of ridges of said die means for applying force to the portion of said sheets along said non-displaced edges for extruding material therebetween to form new edges of extruded material extending over and beyond the displaced edges of said displaced region for securing together said sheets of material.

12. The means of claim 11 including means supporting said punch means and anvil means for movement toward and away from said die means with said punch means extending through the central opening of said anvil means, means supporting said die means in alignment for coaction with said punch means and anvil means, and motive means for actuating said punch means and anvil means for movement toward and away from said die means during a fastening operation.

13. The means of claim 12 in which said motive means during a fastening operation initially moves said punch means toward said die means for shearing and displacing said region of said sheets of material and subsequently moves said anvil means toward said die means for retaining said sheets of material therebetween while said motive means moves said punch means away from said die means, said motive means continuing to move said anvil means toward said die means for compressing said material therebetween for extruding material therebetween to form new edges of extruded material extending over and beyond the displaced edges of said displaced portion for securing together said sheets of material, said motive means thereafter moving said anvil means away from said die means for disengaging said sheets of material.

14. The means of claim 13 in which said motive means includes a first pivoted lever means having a first end connected with said punch means for providing linear reciprocal movement of said punch means, a second pivoted lever means having a first end connected with said anvil means for providing linear reciprocal movement of said anvil means, said first and second lever means each having a second end, and drive means engaging said second ends of said lever means for producing motion by said punch means toward said die means preceeding the motion of said anvil means toward said die means and motion of said punch means away from said die means preceeding the motion of said anvil means away from said die means.

15. The means of claim 14 in which said drive means comprises a rotatably driven shaft with first and second off-center cylindrical sections rotating therewith, said first cylindrical section being angularly advanced with respect to said second cylindrical section by approximately 45 degrees, and first and second link means each having a first end with a cylindrical bearing surface respectively engaging said first and second cylindrical sections of said shaft and a second end pivotally connected respectively with the second ends of said first and second lever means, whereby said first and second levers are actuated about their pivots by said link means with the motion of said first lever being advanced with respect to the motion of said second lever.

16. A machine means for securing together two sheets of metallic material comprising:
  (a) punch means for engaging the top surface of sheets of metallic material positioned one over another,
  (b) die means having edges defining a central opening for receiving therein said punch means and a region of said sheets displaced by the coaction of said die means with said punch means and surface surrounding said opening including a plurality of ridges coextensive with said edges defining said central opening for applying force to the bottom surface of said sheets of material along a narrow strip for extruding material to form new edges in said material,
  (c) anvil means having a central opening for movably receiving and retaining said punch means therein and having a substantially flat surface surrounding said opening for coacting with the plurality of ridges of said surface of said die means,
  (d) means supporting said punch and anvil means for movement toward and away from said die means with said punch means extending through the central opening of said anvil means,
  (e) means supporting said die means in alignment for coaction with said punch means and said anvil means, and
  (f) motive means for actuating said punch means and anvil means for movement toward and away from said die means during a fastening operation.

17. The means of claim 16 in which said motive means during a fastening operation initially moves said punch means toward said die means for shearing and displacing a region of said sheets positioned therebetween and subsequently moves said anvil means toward said die means for retaining said sheets of material therebetween while said motive means moves said punch means away from said die means, said motive means continuing to move said anvil means toward said die means for compressing said material therebetween, said motive means thereafter moving said anvil means away from said die means for disengaging said sheets of material.

18. The means of claim 17 in which said motive means includes a first pivoted lever means having a first end connected with said punch means for providing linear reciprocal movement of said punch means, a second pivoted lever means having a first end connected with said anvil means for providing linear reciprocal movement of said anvil means, said first and second lever means each having a second end, and drive means engaging said second ends of said lever means for producing motion by said punch means toward said die means preceeding the motion of said anvil means toward said die means and motion of said punch means away from said die means preceeding the motion of said anvil means away from said die means.

19. The means of claim 18 in which said drive means comprises a rotatably driven shaft with first and second off-center cylindrical sections rotating therewith, said first cylindrical section being angularly advanced with respect to said second cylindrical section by approximately 45 degrees, and first and second link means each having a first end with a cylindrical bearing surface respectively engaging said first and second cylindrical sections of said shaft and a second end pivotally connected respectively with the second ends of said first and second lever means, whereby said first and second levers are actuated about their pivots by said link means with the motion of said first lever being advanced with respect to the motion of said second lever.

References Cited

UNITED STATES PATENTS

| | | | |
|---|---|---|---|
| 2,254,558 | 9/1941 | Williams | 29—521 X |
| 2,288,308 | 6/1942 | Williams | 29—521 X |
| 2,619,855 | 12/1952 | Williams | 29—566 X |
| 2,671,361 | 3/1954 | Sandberg | 29—21.1 X |
| 2,811,880 | 11/1957 | Williams | 29—566 |
| 2,927,548 | 3/1960 | Wellington | 29—21.1 X |
| 3,130,489 | 4/1964 | Schlage | 29—21.1 X |

JOHN F. CAMPBELL, Primary Examiner

D. C. REILEY, Assistant Examiner

U.S. Cl. X.R.

29—509, 521, 522; 72—464, 332